United States Patent
Xiao

(10) Patent No.: US 8,629,791 B2
(45) Date of Patent: *Jan. 14, 2014

(54) DATA COMPRESSION BY MULTI-ORDER DIFFERENCING

(75) Inventor: Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 274 days.

This patent is subject to a terminal disclaimer.

(21) Appl. No.: 13/226,129

(22) Filed: Sep. 6, 2011

(65) Prior Publication Data

US 2011/0316728 A1    Dec. 29, 2011

Related U.S. Application Data

(63) Continuation of application No. 12/718,384, filed on Mar. 5, 2010, now Pat. No. 8,031,089, which is a continuation of application No. 12/180,143, filed on Jul. 25, 2008, now Pat. No. 7,701,366.

(51) Int. Cl.
  *H03M 7/34* (2006.01)
  *H03M 7/38* (2006.01)

(52) U.S. Cl.
  USPC .............................................. 341/51; 341/76

(58) Field of Classification Search
  USPC .......... 341/51, 50, 67, 76, 106; 701/213, 215; 342/357.01
  See application file for complete search history.

(56) References Cited

U.S. PATENT DOCUMENTS

| | | | |
|---|---|---|---|
| 5,150,209 A | 9/1992 | Baker et al. | |
| 6,211,819 B1 | 4/2001 | King et al. | |
| 6,429,811 B1 | 8/2002 | Zhao et al. | |
| 6,463,179 B1 | 10/2002 | Kondo et al. | |
| 6,651,000 B2 | 11/2003 | van Diggelen et al. | |
| 6,772,065 B2 * | 8/2004 | Sanmiya et al. | 701/469 |
| 6,947,944 B1 | 9/2005 | Furuike | |
| 7,342,965 B2 | 3/2008 | Lainema | |
| 7,447,258 B2 * | 11/2008 | Pietila et al. | 375/150 |
| 7,701,366 B2 * | 4/2010 | Xiao | 341/51 |
| 8,031,089 B2 * | 10/2011 | Xiao | 341/51 |
| 2007/0016371 A1 | 1/2007 | Waid et al. | |

* cited by examiner

*Primary Examiner* — Peguy Jean Pierre

(57) ABSTRACT

Embodiments of the present invention enable compression and decompression of data. Applications of the present invention are its use in embodiments of systems for compression and decompression of GPS long-term Ephemeris (LTE) data, although the present invention is not limited to such applications. In embodiments, the LTE data may be grouped into a set of data values associated with a parameter. In embodiments, a data set may be compressed by using a multi-order differencing scheme. In such a scheme, a set of the differences between values may be compressed because the differences have smaller magnitudes than the values. In embodiments, a multi-order differencing scheme determines how many levels (orders) of differencing may be applied to an original data set before it is compressed. In embodiments, the original data may be recovered from a compressed data set based on the type of multi-order differencing scheme used to generate the compressed data.

9 Claims, 13 Drawing Sheets

DATA COMPRESSION BY MULTI-ORDER DIFFERENCING

CROSS-REFERENCE TO RELATED APPLICATION(S)

This application is a continuation of, and claims priority under 35 U.S.C. §120 on, U.S. application Ser. No. 12/718,384, filed on Mar. 5, 2010, which is a continuation of, and claims priority under 35 U.S.C. §120 on, application Ser. No. 12/180,143, filed on Jul. 25, 2008, both of the same title as the present application. The contents of these related applications are incorporated by reference herein in their entirety.

BACKGROUND

A. Technical Field

The present invention pertains generally to data processing, and relates more particularly to data compression and decompression.

B. Background of the Invention

Data compression is the encoding of a data set so that fewer bits are necessary to represent the encoded data. Data compression is important for data communication, because the smaller compressed data sets require fewer resources for storage and also require less bandwidth for data transmission than would be required for the original uncompressed data sets.

Efficient data compression should address key issues. For example, it is possible to employ a data compression scheme that will result in information loss as the data are encoded. To maintain precision, a lossless data compression scheme is required. Data compression processing may require a large amount of computing resources such as memory, and the computing resources requirement may not scale when large data sets are being compressed. It is important for an application to employ efficient data compression methods in order to avoid excessive computing resources requirements.

In order to use data in a compressed data set, the compressed data set must first be decompressed (decoded). Data decompression is based on the same scheme that was used for data compression. In a typical communication system, a client device performs data compression on a transmitted compressed data package that it has received. Recently, a large variety of consumer electronics devices are being used as client devices, and these devices have limited computing resources. It is important that a data decompression scheme be both lossless and efficient to enable the widest variety of client devices to be used in data communication.

SUMMARY OF THE INVENTION

Embodiments of the present invention enable compression and decompression of data. Applications of the present invention are its use in embodiments of systems for compression and decompression of GPS long-term Ephemeris (LTE) data, although the present invention is not limited to such applications. In embodiments, the LTE data may be grouped so that each group contains the data values of a parameter that are taken at different recording timings for a given satellite. In embodiments, the ordered data set associated with each group may be compressed individually according to a compression scheme based on the distribution of the values within the group. In embodiments, an ordered data set may be compressed by using a multi-order differencing scheme. In such a scheme, a set of the differences may be compressed instead of the original values because the differences have much smaller magnitudes than the original values. More than one level (order) of differences may be applied to a data set. In embodiments, a multi-order differencing scheme determines how many levels (orders) of differencing may be applied to an original data set before it is compressed. In embodiments, the particular scheme being applied may be determined by data type, parameter type, and distribution of the original or difference values. In embodiments, the original data may be recovered from a compressed data set based on the type of multi-order differencing scheme used to generate the compressed data.

In embodiments, a method for compressing GPS LTE data may comprise grouping the GPS LTE data per parameter with data values of the corresponding parameter taken at different timings, designating a set of original data values for a parameter in the GPS LTE data to associate with a multi-ordered difference scheme, and using such scheme to compress the set of data values.

The method may further comprise determining other values including one or more reference values, a set of first-order difference values, a set of second-order difference values, a set of third-order difference values, and/or a set of third-order difference values. The method may further comprise determining bit lengths, each of which encodes one or more of the determined values. The method may further comprise storing a compressed data record that includes some or all of the determined values and bit lengths.

In some embodiments, the parameter associated with the multi-order difference scheme includes one or more of the following: "health", "uraidx", "Omega0", "af0", "af1", "e", "m0", "asqrt", "omega", "crs", "crc", "cus", "cuc", "cis", "cic", "omegadot", "deltan", "idot", and "i0".

The present invention may further be embodied in a method for compressing a long-term Ephemeris (LTE) data, the method including: grouping the LTE data parameter with data values of the corresponding parameter taken at different timings; designating a set of original data values for a parameter in the LTE data to associate with a multi-order difference scheme; and using the multi-order difference scheme associated with the parameter to compress the set of original data values.

This method may further include: determining a reference value, the reference value being an original value of the parameter; determining a set of first-order difference values, the first-order difference values being difference values between neighboring original values of the parameter; determining a reference value bit length to encode the reference values; determining a difference value bit length to encode the first-order difference values; and storing a compressed data record, the compressed data record including the reference value bit length, the difference value bit length, the reference value, and the set of first-order difference values; wherein the parameter associated with the multi-order difference scheme includes a value of either 0 or 1.

This method may further include: determining a first reference value, the first reference value being an original value of the parameter; determining a set of first-order difference values, the first-order difference values being difference values between neighboring original values of the parameter; determining a second reference value, the second reference value being a first-order difference value within the set of first-order difference values; determining a set of second-order difference values, the second-order difference values being difference values between neighboring first-order difference values of the parameter; determining a first reference value bit length to encode the first reference value; determining a second reference value bit length to encode the second reference value; determining a second-order difference value bit length to encode the second-order difference values; and storing a compressed data record, the compressed data record including the first reference value bit length, the second reference value bit length, the second-order difference value bit length, the first reference value, the second reference value, and the set of first-order difference values; wherein the parameter associated with the multi-order difference scheme includes values which are smaller than a prescribed value and distributed within a prescribed range.

Alternatively, the present method may include: determining a first reference value, the first reference value being an original value of the parameter; determining a set of first-order difference values, the first-order difference values being difference values between neighboring original values of the parameter; determining a second reference value, the second reference value being one of the first-order difference values of the parameter; determining a set of second-order difference values, the second-order difference values being difference values between neighboring first-order difference values of the parameter; determining a second-order difference value bit length to encode the second-order difference values; designating a bit length associated with the parameter as the bit length for the first reference value and the second reference value; and storing a compressed data record, the compressed data record including the bit length for the first and second reference values, the second-order difference value bit length, the first reference value, the second reference value, and the set of second-order difference values; wherein the parameter associated with the multi-order difference scheme includes values which are distributed within straight line segment having different magnitudes.

Further alternatively, the present method may include: determining a first reference value, the first reference value being an original value of the parameter; determining a set of first-order difference values, the first-order difference values being difference values between neighboring original values of the parameter; determining a set of second-order difference values, the second-order difference values being difference values between every two first-order difference values of the parameter; determining a second reference value and a third reference value, the second reference value and the third reference value being first-order difference values within the set of first-order difference values; determining a second-order difference value bit length to encode the second-order difference values; designating a bit length associated with the parameter as the bit length for the first reference value; determining a bit length for the second reference value and the third reference value; and storing a compressed data record, the compressed data record including the bit length for the first reference value, the bit length for the second and third reference values, the second-order difference value bit length, the first reference value, the second reference value, the third reference value, and the set of second-order difference values; wherein the parameter associated with the multi-order difference scheme includes values which are distributed within two interlaced straight lines having different magnitudes whose difference is smaller than a prescribed value.

The preferred method may also include: determining a first reference value, the first reference value being an original value of the parameter; determining a set of first-order difference values, the first-order difference values being difference values between neighboring original values of the parameter; determining a second reference value, the second reference value being a first-order difference value within the set of first-order difference values; determining a set of second-order difference values, the second-order difference values being difference values between the second reference value and the first-order difference values of the parameter; determining a set of third-order difference values, the third-order difference values being difference values between every two second-order difference values; determining a third reference value and a fourth reference value, the third and fourth reference values being designated from the set of second-order difference values; determining a set of fourth-order difference values, the fourth-order difference values being difference values between every four third-order difference values; determining fifth, sixth, seventh, and eighth reference values designated from the set of third-order difference values; determining a fourth-order difference value bit length to encode the fourth-order difference values; designating a bit length associated with the parameter as the bit length for the first reference value; determining a bit length for the second reference value and the third reference value, and determining a bit length for the fifth, sixth, seventh, and eighth reference values; and storing a compressed data record, the compressed data record including the bit length for the first reference value, the bit length for the second and third reference values, the bit length for the fifth, sixth, seventh, and eighth reference values, the fourth-order difference value bit length, the first through the eighth reference values, and the set of fourth-order difference values; wherein the parameter associated with the multi-order difference scheme includes values which are distributed within two interlaced straight lines having different magnitudes whose difference is not smaller than the prescribed value.

Alternatively, the preferred method may include: designating four original values as first, second, third, and fourth reference values; determining a set of first-order difference values, the first order difference values being difference values between every four original values of the parameter; designating four first-order difference values within the set of first-order difference values as fifth, sixth, seventh, and eighth reference values, respectively; determining a set of second-order difference values, the second-order difference values being difference values between every four first-order difference values within the set of the first-order difference values; designating a second-order difference value as a ninth reference value; determining a set of third-order difference values, the third-order difference values being difference values between neighboring second-order difference values; determining a third-order difference value bit length to encode the third-order difference values; designating a bit length associated with the parameter as the bit length for the first, second, third, and fourth reference values; determining a bit length for the fifth, sixth, seventh, and eighth reference values; determining a bit length for the ninth reference value; and storing a compressed data record, the compressed data record including the bit length for the first, second, third and fourth reference values, the bit length for the fifth, sixth, seventh and eighth reference values, the bit length for the ninth reference value, the third-order difference value bit length, the first through the ninth reference values, and the set of third-order difference values; wherein the parameter associated with the multi-order difference scheme includes values which are distributed within four interlaced sine curves.

The present invention may further be embodied in an apparatus for compressing a long-term Ephemeris (LTE) data, the apparatus including: grouping section that groups the LTE data parameter with data values of the corresponding parameter taken at different timings; designating section that designates a set of original data values for a parameter in the LTE data to associate with a multi-order difference scheme; and compressing section that compresses the LTE using the multi-order difference scheme associated with the parameter to compress the set of original data values.

The present invention may further be embodied in an apparatus for decompressing a long-term Ephemeris (LTE) data, the apparatus including: a value extractor that extracts at least one reference value and a set of difference values from the compressed data record; and a value calculator that calculates an uncompressed set of data values based on the at least one reference value and the set of difference values.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that the scope of the invention is not limited to these particular embodiments.

DETAILED DESCRIPTION OF THE PREFERRED EMBODIMENTS

Figure 1:
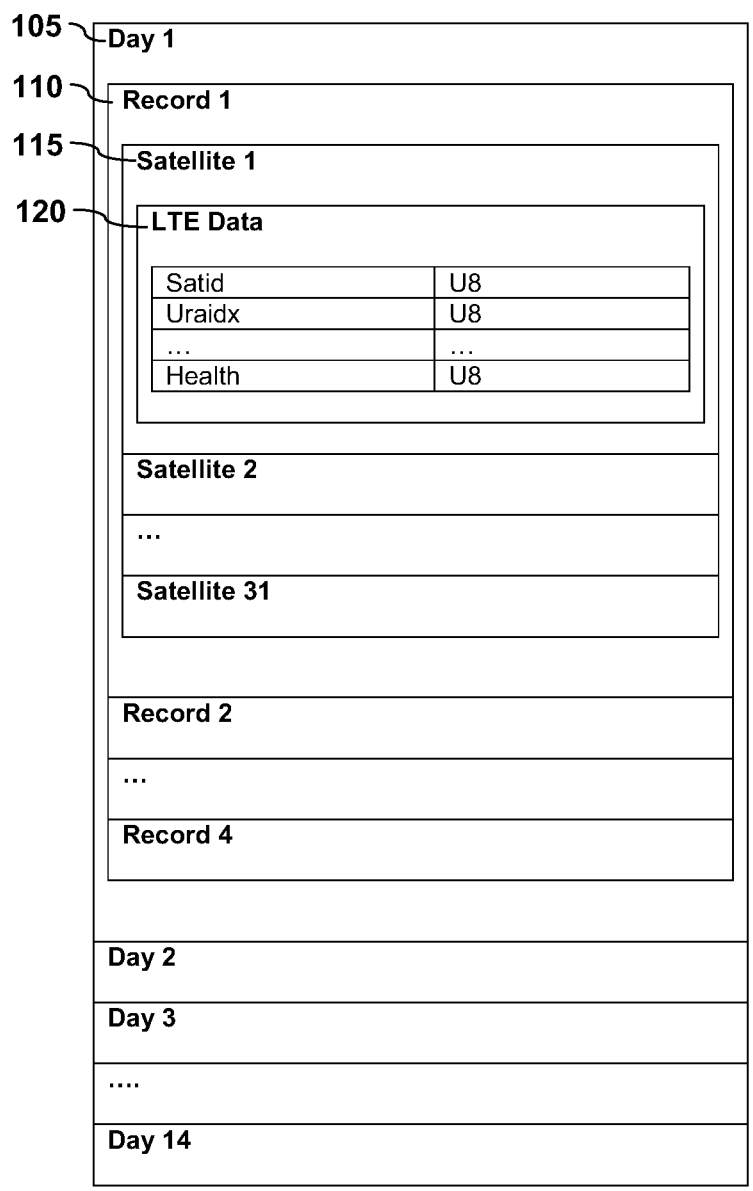
FIG. 1 illustrates an exemplary GPS data package.

Embodiments of the present invention enable compression and decompression of data. Applications of the present invention are its use in embodiments of systems for compression and decompression of GPS long-term Ephemeris (LTE) data, although the present invention is not limited to such applications. In embodiments, the LTE data may be grouped so that each group contains the data values of a parameter that are taken at different recording timings for a given satellite. In embodiments, the ordered data set associated with each group may be compressed individually according to a compression scheme based on the distribution of the values within the group. In embodiments, an ordered data set may be compressed by using a multi-order differencing scheme. In such a scheme, a set of the differences may be compressed instead of the original values because the differences have much smaller magnitudes than the original values. More than one level (order) of differences may be applied to a data set. In embodiments, a multi-order differencing scheme determines how many levels (orders) of differencing may be applied to an original data set before it is compressed. In embodiments, the particular scheme being applied may be determined by data type, parameter type, and distribution of the original or difference values. In embodiments, the original data may be recovered from a compressed data set based on the type of multi-order differencing scheme used to generate the compressed data.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or a combination thereof. Accordingly, the flow charts described below are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment" or "an embodiment" means that a particular feature, structure, characteristic, or function described in connection with the embodiment is included in at least one embodiment of the invention and may be in more than one embodiment. The appearances of the phrase "in one embodiment" in various places in the specification are not necessarily all referring to the same embodiment.

A. Overview

One specific application of the present invention is its use in embodiments of systems for compression and decompression of GPS long-term Ephemeris (LTE) data. These embodiments will be described for illustrative purposes and not for limitation. One skilled in the art shall recognize the general applicability of the present invention.

With the rapid technical development in the recent decade, the Global Positioning System (GPS) has been widely used for navigation and other applications requiring precise positioning. GPS functionality has been incorporated into many types of consumer electronic devices, especially portable devices such as cell phones. Due to limited bandwidth, the GPS data typically are compressed before transmitting them to a client device from a server, and they are decompressed on the client device when they are received. Therefore, it is important to develop an efficient scheme for both compression of GPS data on the server side and decompression of the compressed data on the client side. Since client devices, such as cell phones, often have limited resources, the scheme for compression and decompression should be designed so that the consumption of memory and other resources on the client side is as low as possible. To maintain the precision of positioning, the compression/decompression should be lossless.

A typical GPS data package contains the motion data of a number of satellites over a period of two weeks. A new set of motion data is recorded at a satellite every six hours (a "timing"); four sets of motion data are recorded per satellite per day. A GPS data package covering a two-week period thus covers fifty-six timings and includes fifty-six sets of data per satellite.

The motion data being recorded are called long-term Ephemeris (LTE) data. A typical LTE data set includes 21 parameters ("fields"). A description of these parameters and their value ranges are listed in the following table.

TABLE 1

LTE data parameters.

| Variable | Bit Length | Description |
|---|---|---|
| satid | 8 | Satellite id<br>value range: 0~31 |
| uraidx | 8 | URA Index for SV Accuracy<br>value range: 0~15 |
| e | 32 | Eccentricity<br>value range: 0~4294967295 |
| asqrt | 32 | Square Root of the Semi-Major Axis<br>value range: 0~4294967295 |
| omega0 | 32 | Longitude of Ascending Node of Orbit Plane at Weekly Epoch<br>value range: −2147483648~2147483647 |
| omegadot | 24 | Rate of Right Ascension<br>value range: −8388608~8388607 |
| i0 | 32 | inclination angle as reference time<br>value range: −2147483648~2147483647 |
| deltan | 16 | Mean Motion Difference From Computed Value<br>value range: −32768~32767 |
| idot | 14 | rate of inclination angle<br>value range: −8192~8191 |
| m0 | 32 | mean anomaly at reference time<br>value range: −2147483648~2147483647 |
| omega | 32 | Argument of Perigee<br>value range: −2147483648~2147483647 |
| crs | 16 | amplitude of sin correction to orbit radius<br>value range: −32768~32767 |
| crc | 16 | amplitude of cos correction to orbit radius<br>value range: −32768~32767 |
| cus | 16 | amp of sin corr to argument of latitude<br>value range: −32768~32767 |
| cuc | 16 | amp of cos corr to argument of latitude<br>value range: −32768~32767 |
| cis | 16 | amp of sin corr to inclination angle<br>value range: −32768~32767 |

TABLE 1-continued

LTE data parameters.

| Variable | Bit Length | Description |
|---|---|---|
| cic | 16 | amp of cos corr to inclination angle<br>value range: −32768~32767 |
| af0 | 22 | 0th order polynomial coefficient<br>value range: −2097152~2097151 |
| af1 | 16 | 1st order polynomial coefficient<br>value range: −32768~32767 |
| af2 | 8 | 2nd order polynomial coefficient<br>value range: −128~127 |
| health | 1 | health data for this satellite<br>0: health<br>1: unhealth |

An exemplary GPS data package contains LTE data recorded over a two-week period from 31 satellites; thus, the package contains 56*31*21 integer values. FIG. 1 illustrates a typical ordering of such an LTE data package. The data are ordered by timing. Each of the 14 days 105 contains the values of the 21 LTE data parameters 120 recorded at each of 4 timings 110 for each of 31 satellites 115.

There may be a strong correlation among the values that have been recorded at different timings for a parameter for a given satellite. In embodiments of the invention, the type and extent of this correlation may provide the basis for achieving a high compression rate for the set of LTE data recorded for each of the satellites.

In embodiments, the LTE data may be grouped so that each group contains the data values of a parameter that are taken at different recording timings for a given satellite. In the LTE data example illustrated in FIG. 1, there are 31 satellites, 21 parameters, and 56 recording timings. These data are divided into 31*21 groups, each of which contains 56 values recorded at the 56 timings. In embodiments, the data associated with each group may be compressed individually according to a compression scheme based on the distribution of the 56 values within the group.

There are certain parameters whose recorded values do not vary across multiple timings. Because there is little to no variability within the values associated with this type of parameter, compression of the group of values need not be based upon correlation. For example, the value of parameter "af2" is always 0 (those skilled in the art will recognize that this parameter is not currently used) so, in embodiments, it is unnecessary to record it in a compressed LTE data set since the value need not be transmitted. The values of parameter "satid" (satellite ID) are different across satellites, but identical at all the recording timings for a given satellite. Thus, in embodiments, only one set of its 31 values needs to be included in a compressed LTE data record. Since this set of values refers to different satellites, there may not be any correlation among them and thus they are included in the data record without further compression.

B. System Implementations

Figure 2A:
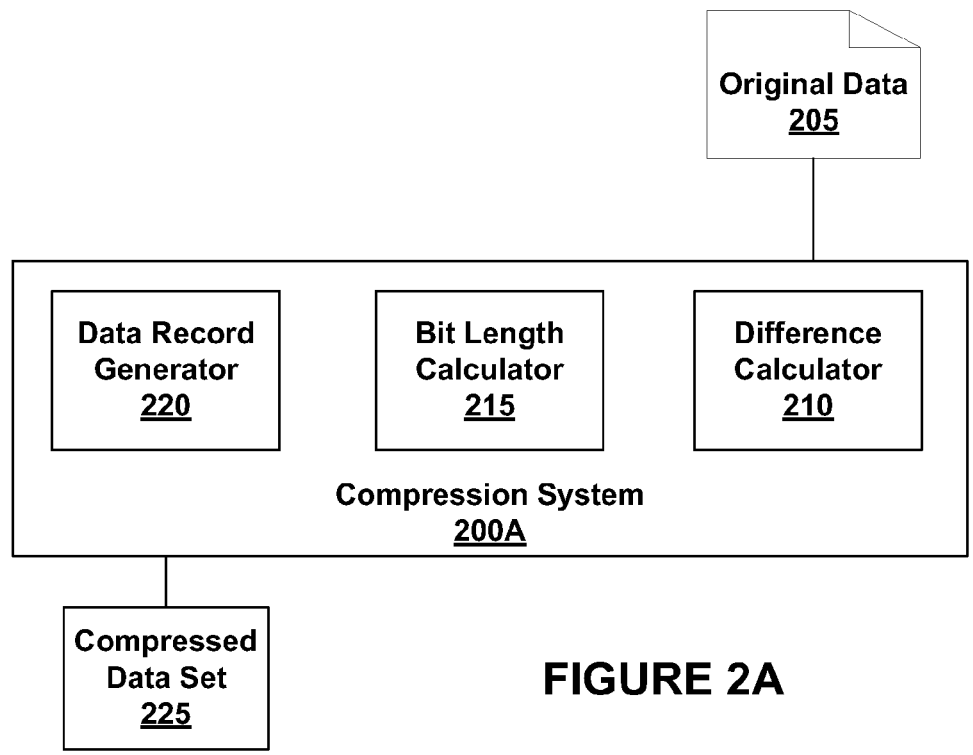
FIG. 2A depicts a block diagram of a system for compressing data according to various embodiments of the invention.

FIG. 2A depicts a system 200A for generating a compressed data set 225 from data 205 according to various embodiments of the invention. System 200A comprises a difference calculator 210, a bit length calculator 215, and a data record generator 220. In embodiments, data 205 may be a set of original data values for a single LTE parameter that have been recorded from a single satellite.

In embodiments, data 205 may be compressed by using a multi-order differencing scheme. In such a scheme, a set of the differences between the original values may be compressed instead of the original values because the differences have much smaller magnitudes than the original values. More than one level (order) of differences may be applied to a data set. For example, the difference between two original parameter values is a first-order difference, and the difference between two first-order differences is a second-order difference. In embodiments, a multi-order differencing scheme determines how many levels (orders) of differencing may be applied to an original data set before it is compressed. In embodiments, the scheme being applied may be determined by the type of data, parameter type, and/or variance of original or difference data values.

In embodiments, difference calculator 210 generates a set of difference values by computing differences between values within a working set of values. The working set of values may contain original values (this would generate a set of first-order difference values), or it may contain difference values (this would generate a set of difference values at a higher order than the difference values within the working set). The type of multi-order differencing scheme being applied may determine how differences are computed. For example, differences may be computed between neighboring values, between every two values, or between every four values within the working set of values.

Each time a set of difference values is generated, at least one reference value is identified from the working set of values. The type of multi-order differencing scheme being applied may determine the number of reference values being identified. For example, one reference value may be identified from a working set within which differences between neighboring values are being computed.

In embodiments, bit length calculator 215 computes at least one bit length to encode the identified reference values from the working set and at least one bit length to encode each of the difference values within the generated set of difference values. In embodiments, bit length computation may be based on at least some of these factors: the type of multi-order differencing scheme, the order level of the values in the working set, the order level of the difference values, and the distribution of difference values within the set of difference values.

In embodiments, data record generator 220 generates a compressed data set 225 representing the data 205. An exemplary compressed data set 225 may contain at least one bit length to encode each of the reference values, at least one bit length to encode a set of difference values, the reference values, and the set of difference values. The data within a compressed data set 225 are ordered according to a pre-defined schema. An exemplary compressed GPS LTE data package would contain 31*21 compressed data sets 225. The data sets within the package may be ordered according to a second pre-defined schema to maximize efficient use of resources on a client device during decompression.

Figure 2B:
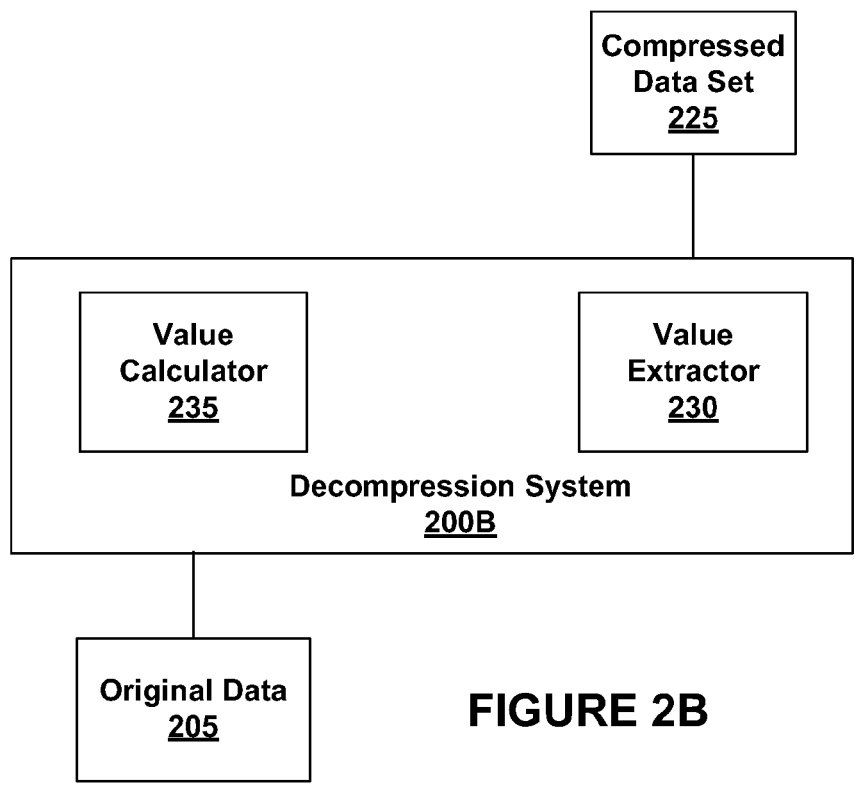
FIG. 2B depicts a block diagram of a system for decompressing a compressed data set according to various embodiments of the invention.

FIG. 2B depicts a system 200B for generating uncompressed data 205 from compressed data 225 according to various embodiments of the invention. System 200B comprises a value extractor 230, and a value calculator 235. In embodiments, compressed data set 225 may be a compressed set of original data values for a single LTE parameter that have been recorded from a single satellite.

In embodiments, value extractor 230 extracts data values from the compressed data set 225 according to the same pre-defined schema used in the compression system 200A to order the data in the compressed data set 225. For example, value extractor 230 may extract at least one bit length to encode the reference values and at least one bit length to encode a set of difference values, and then use the reference value bit lengths to extract the reference values, and use the at least one difference value bit length to extract the set of difference values.

In embodiments, value calculator 235 computes the original data 205 based on the extracted reference values and the set of difference values from the compressed data set 225, as well as on the type of multi-ordered differencing scheme used by system 200A to generate the compressed data set 225. Methods for restoring an original ordered data set 205 from a set of extracted reference values and difference values will be discussed in detail within the following sections.

C. Methods for Data Compression Using Multi-Order Differencing

Figure 3:
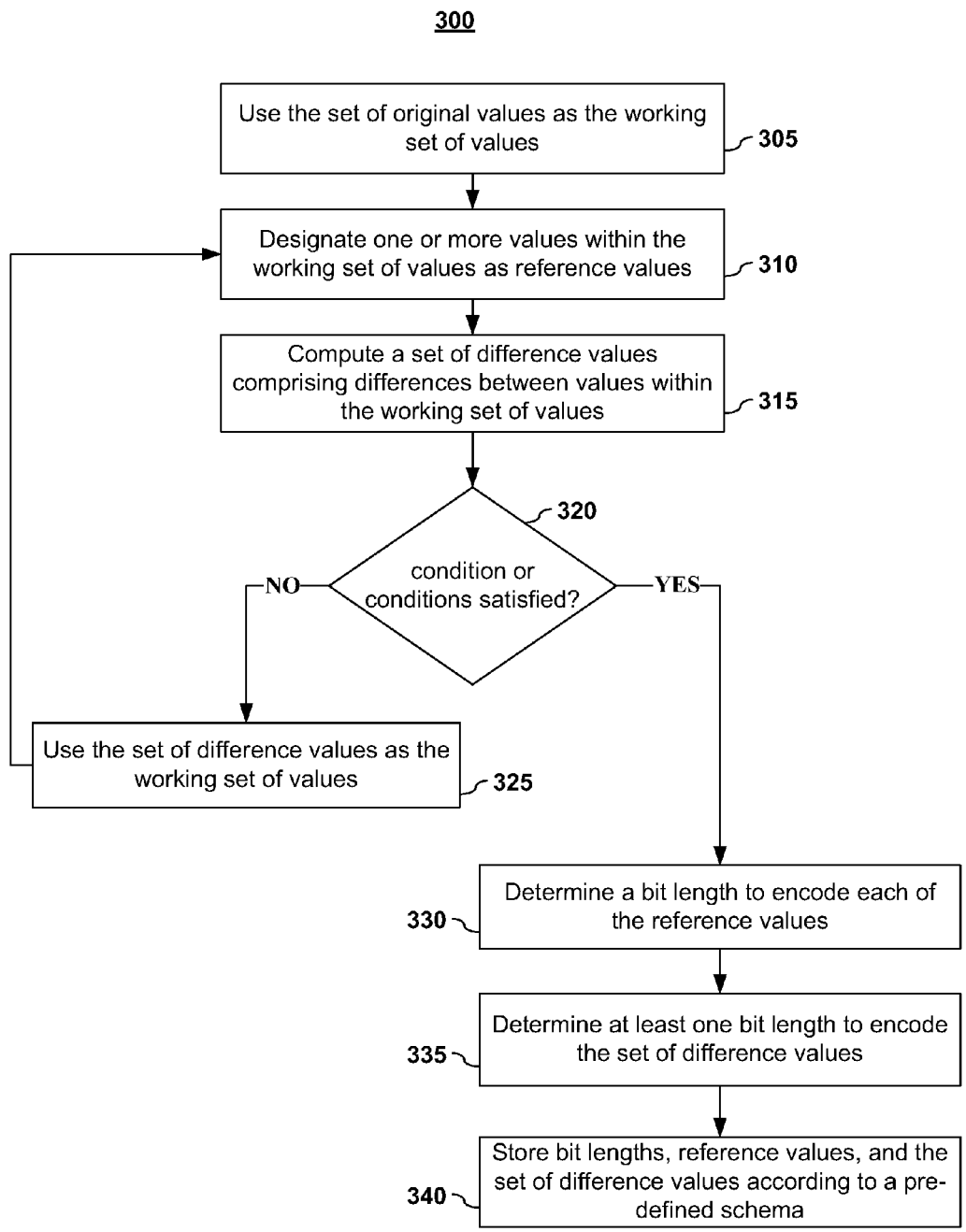
FIG. 3 depicts a method for compressing data according to various embodiments of the invention.

FIG. 3 depicts a method 300 for compressing data according to various embodiments of the invention. Method 300 may be implemented in embodiments of system 200A.

In embodiments, data 205 may be compressed by using a multi-order differencing scheme. In such a scheme, a set of the differences may be compressed instead of the set of the original values because the differences have much smaller magnitudes than the original values. More than one level (order) of differences may be applied to a data set. In embodiments, a multi-order differencing scheme determines how many levels (orders) of differencing may be applied to an original data set before it is compressed. In embodiments, the scheme being applied may be determined by the type of data, parameter type, and/or variance of original or difference data values.

Initially, the set of original values is used 305 as the working set of values. One or more values within the set are designated 310 as reference values. In embodiments, the selected values may be determined by the data type, parameter type, and/or type of multi-order differencing scheme being applied. A set of difference values between values within the working set of values is calculated 315. The type of multi-order differencing scheme being applied determines between which values within the working set of values each difference value is calculated. For example, in various embodiments differences may be calculated between neighboring values, between every two values, or between every four values. One skilled in the art shall recognize that other differencing configurations may be used.

At least one condition is evaluated 320 in order to determine whether another level (order) of differences may be calculated. Exemplary conditions include the current order of difference values within the set of difference values (for example, the difference between two original parameter values is a first-order difference, and the difference between two first-order differences is a second-order difference) and the type of multi-order differencing scheme being applied. Additional exemplary conditions may be based upon at least one characteristic of the set of difference values, such as a comparison of the variance of the set of difference values to a threshold value. In embodiments, this condition is satisfied if the variance is less than the threshold value. Those skilled in the art will recognize that a variety of conditions may be used.

If the condition or conditions are not satisfied, the set of difference values is used 325 as the working set of values, and another order of differences is computed by repeating steps 310 through 320.

If the condition or conditions are satisfied, bit lengths are determined 330 to encode each of the identified reference values. For example, in embodiments the bit length for encoding more than one reference value associated with a particular working set is the bit length that encodes the maximum of the set of reference values. In embodiments, if a bit length is associated with an original value, that bit length may be used for one or more reference values.

At least one bit length is computed 335 for encoding each of the difference values within the set of difference values. In embodiments, the computation of this bit length may be based on factors such as the type of multi-order differencing scheme being applied and at least one characteristic of the set of difference values. This computation will be discussed in more detail within the following sections.

A compressed data set 225 comprises the determined bit lengths, the reference values, and the set of difference values, ordered 340 according to a pre-defined schema.

The following sections describe various embodiments of method 300 used to compress data by applying a multi-order differencing scheme associated with the data distribution pattern characteristic of the data within the data set. For purposes of illustration and not limitation, each type of multi-order differencing scheme is described in terms of its application to the compression of a GPS LTE data set associated with some of the exemplary parameters listed in Table 1.

1. A First Embodiment of a Method for Compression of Data

Figure 4:
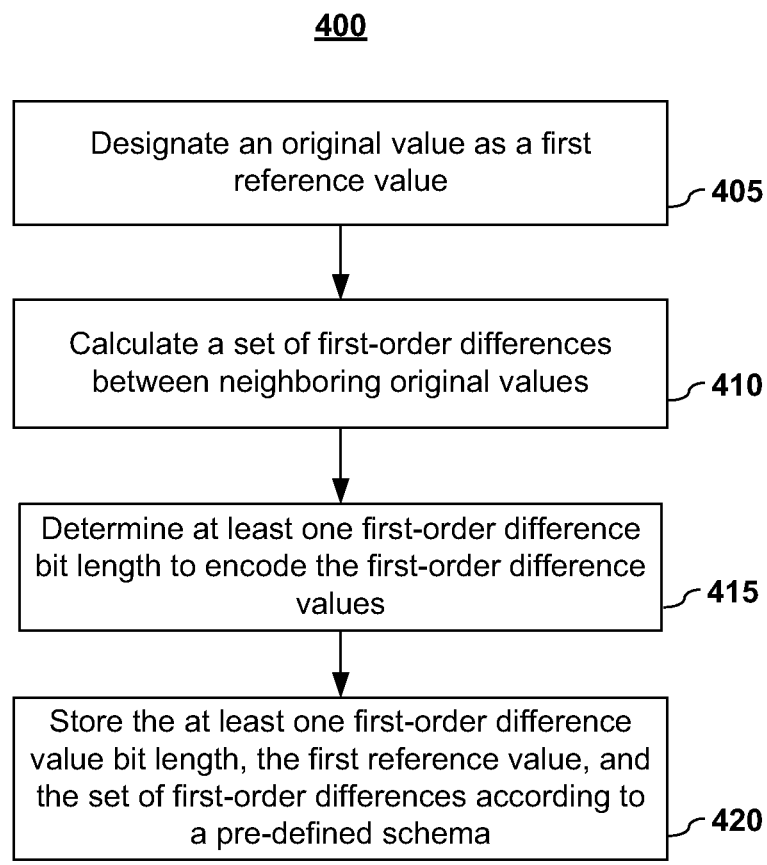
FIG. 4 depicts a method for compressing data in which the values are within a defined set of values according to various embodiments of the invention.

FIG. 4 depicts a method 400 for compressing data 205 according to various embodiments of the invention. An exemplary set of 56 data values 205 is associated with the GPS parameter "health" (See Table 1). Each of the data values associated with "health" has a value of either 0 or 1 and often the values within the set of values are constant.

In embodiments, an original value is designated 405 as a first reference value. A set of first-order difference values is calculated 410 between neighboring original values according to the following equation:

$$D_i^1 = D_i^0 - D_{i-1}^0, i=2,\ldots,56 \quad (1)$$

where $D_i^0$ is the ith original value, and $D_i^1$ is the ith first-order difference. In this example, $D_1^0$ is designated as the first reference value.

The bit length $B^j$ to encode the difference values for order j is calculated 415 according to the following equation:

$$B^j = \begin{cases} \text{ceil}(\log_2(\max(|D^j|)+1))+1, & \max(|D^j|) > 0 \\ 0, & \max(|D^j|) = 0 \end{cases} \quad (2)$$

For a first-order difference, j=1 and $D^1 = \{D_2^1 \ldots D_{56}^1\}$. Equation (2) determines the minimum bit length sufficient to store the difference values.

The reference value bit length, the first-order difference value bit length, the reference value, and the set of first-order differences are stored 420 in a compressed data set 225 according to a pre-defined schema. In embodiments, since the maximum value for "health" only takes one bit, the first reference value bit length will be one bit. The calculated bit length $B^1$ will be the first-order difference value bit length. In embodiments, if the first-order difference values are all 0, the computed bit length $B^1$ will be 0 and thus the set of first-order difference values and the computed bit length will not be stored in the compressed data set 225.

2. A Second Embodiment of a Method for Compression of Data

Figure 5:
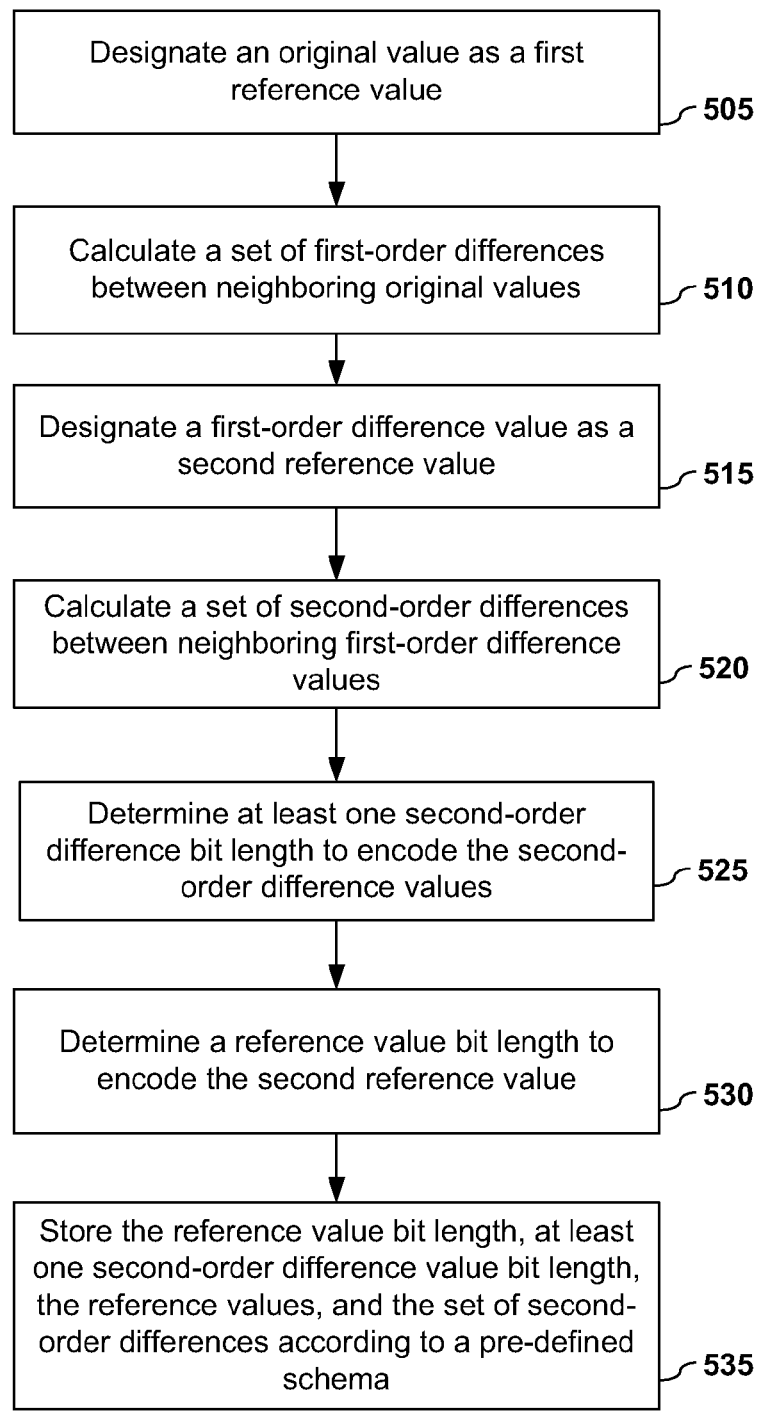
FIG. 5 depicts a method for compressing data in which the values are distributed close together according to various embodiments of the invention.

FIG. 5 depicts a method 500 for compressing data 205 according to various embodiments of the invention. The method depicted in FIG. 5 may be used for data in which the values are small and distributed within a tight cluster. An exemplary set of 56 data values 205 is associated with the GPS parameter "uraidx" (See Table 1).

In embodiments, an original value is designated 505 as a first reference value. A set of first-order difference values is calculated 510 between neighboring original values according to Equation (1) as previously discussed.

A first-order difference value is designated 515 as a second reference value (e.g., $D_2^1$), and a set of second-order differences is calculated 520 between neighboring first-order difference values according to the equation $$D_i^2 = D_i^1 - D_{i-1}^1, i=3,\ldots,56 \quad (3)$$

In embodiments, the first reference value bit length is 8 bits because the maximum value of the parameter "uraidx" is one byte. Alternatively, the bit length may be determined using Equation (2). The second reference value bit length is determined 530 according to equation (2), where j=1 as previously discussed.

A second-order difference value bit length is calculated 525 using Equation (2) where j=2 and $D^2 = \{D_3^2, D_4^2, \ldots, D_{56}^2\}$.

The reference value bit lengths, the second-order difference value bit length, the reference values, and the set of second-order differences are stored 535 in a compressed data set 225 according to a pre-defined schema. In embodiments, if the second-order difference values are all 0, the computed bit length $B^2$ will be 0 and thus the set of second-order difference values and the computed bit length will not be stored in the compressed data set 225.

3. A Third Embodiment of a Method for Compression of Data

Figure 6:
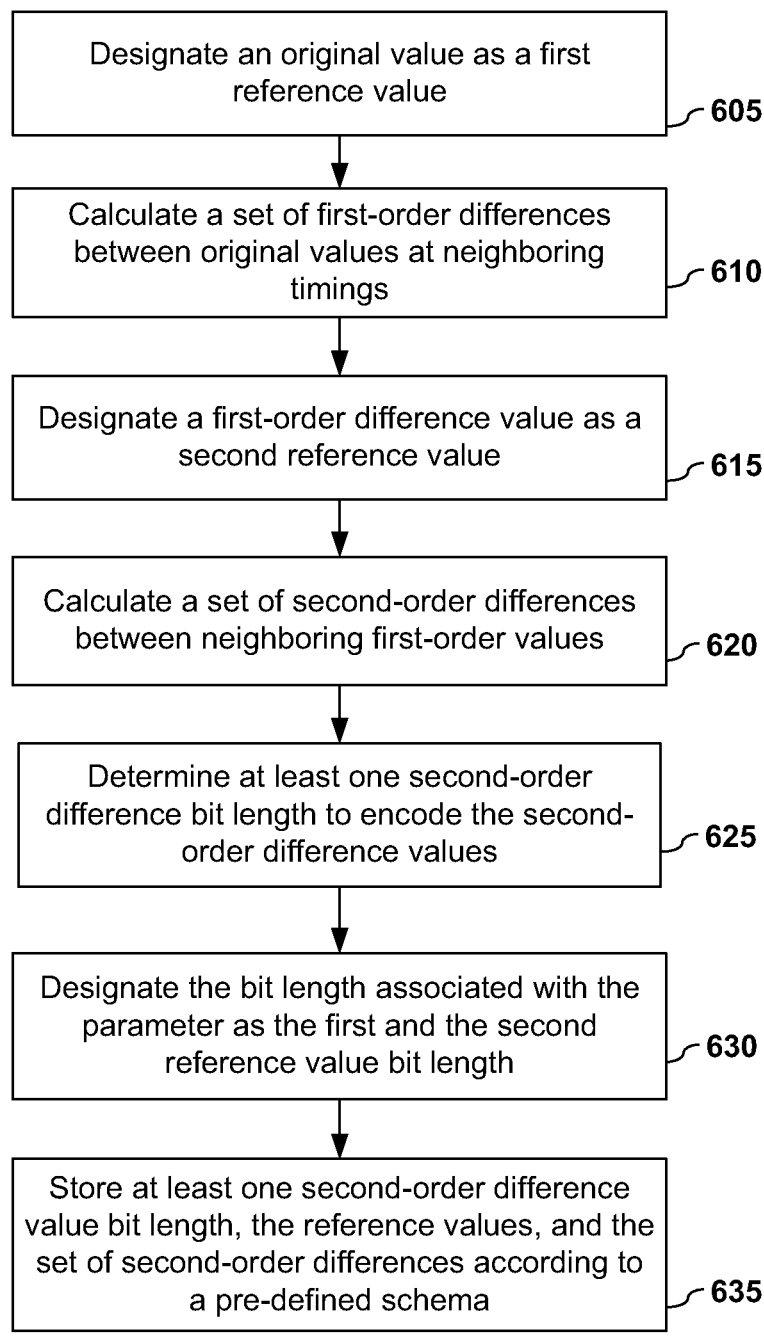
FIG. 6 depicts another method for compressing data according to various embodiments of the invention.

FIG. 6 depicts a method 600 for compressing data 205 according to various embodiments of the invention. The method depicted in FIG. 6 may be used for data in which the values are distributed within straight line segments having different magnitudes. An exemplary set of 56 data values 205 is associated with the GPS parameter "omega0" (See Table 1).

In embodiments, an original value is designated 605 as a first reference value. A set of first-order difference values is calculated 610 between neighboring original values according to Equation (1) as previously discussed.

Since each line segment is almost straight, only one first-order difference value may be designated 615 as a second reference value $D_2^1$, and a set of second-order differences is calculated 620 between neighboring first-order difference values according to Equation (3) as previously discussed.

In embodiments, a second-order value difference bit length is calculated 625 based on equation (2), as previously discussed. In various embodiments, an additional second-order value difference bit length is calculated based on a length optimization method such as method 700, which is further discussed in detail in a following section that references FIG. 7.

In embodiments, the first and second reference values are each assigned 630 the bit length designated for the parameter (e.g., the bit length associated with "omega0"). Alternatively, one or both of the reference values may have a bit length determined according to Equation (2).

The reference values bit length, at least one second-order difference value bit length, the reference values, and the set of second-order difference values are stored 635 in a compressed data set 225 according to a pre-defined schema.

a) Optimization by Calculating a Second Difference Value Bit Length

In embodiments of method 300, the magnitudes of the difference values within a set of difference values may be classified into groups. In various embodiments, the average magnitude of difference values within a first group is small relative to the average magnitude of difference values within a second group. In such cases, a determination of a single difference value bit length according to Equation (2) may not provide optimal compression efficiency when it is used to encode a set of difference values or a group of reference values. Therefore, in embodiments, one or more difference value bit lengths may be calculated for encoding the smaller magnitude differences. In embodiments using two bit lengths, an additional label bit is added to associate each encoded difference value with either the first or second difference value bit length.

Figure 7:
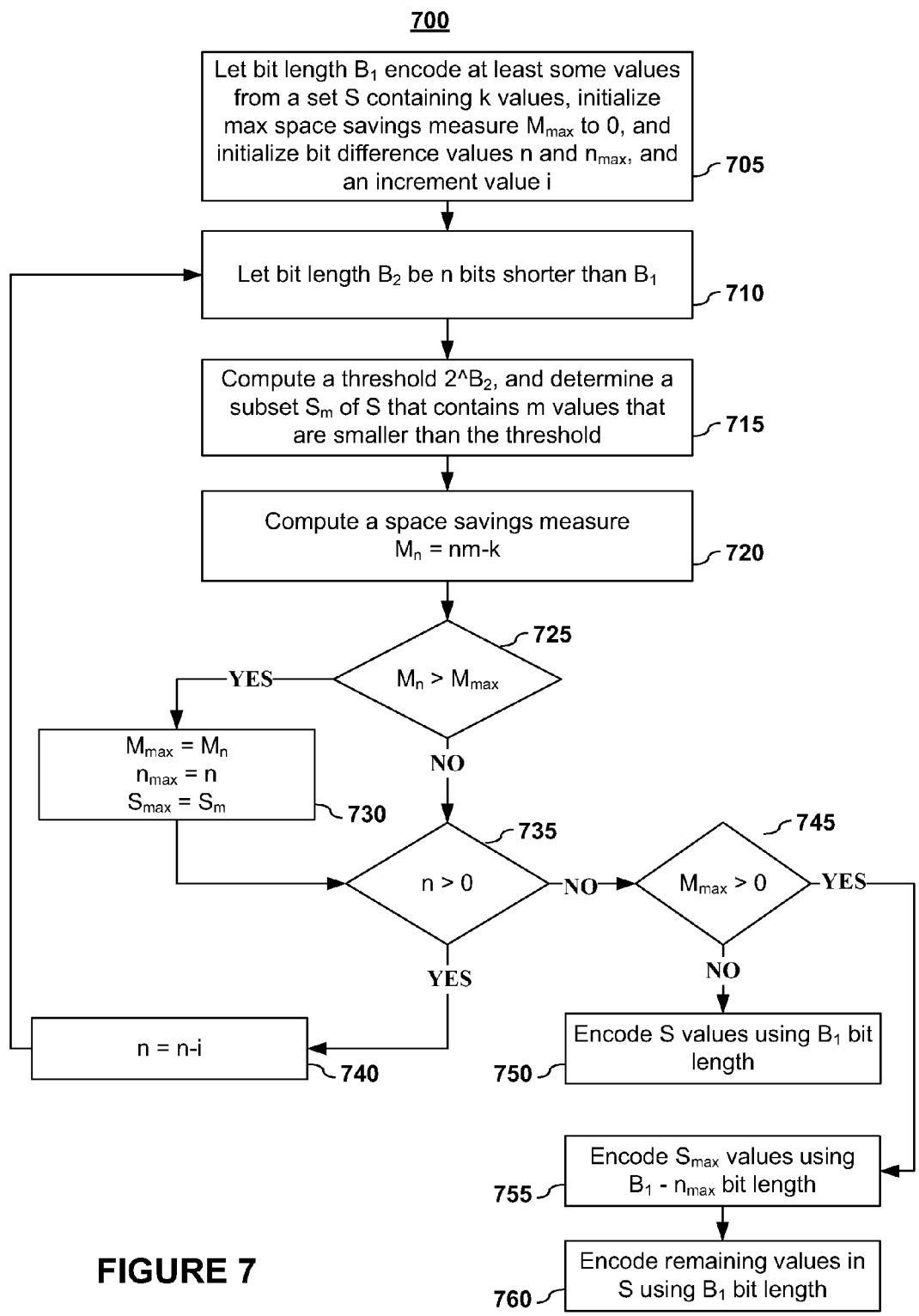
FIG. 7 depicts a method for determining at least one bit length for encoding a set of values according to various embodiments of the invention.

FIG. 7 depicts a method 700 for determining at least one bit length for encoding a set of values according to various embodiments of the invention. FIG. 7 may be implemented as step 330 and/or 335 in embodiments of method 300.

A bit length $B_1$ is calculated using Equation (2) to encode each value from a set S containing k values. A bit difference n and an increment value i are initialized 705, and a maximum space savings measure $M_{max}$ is initialized to 0 and its corresponding $n_{max}$ is initialized to n. A second bit length $B_2$ is defined 710 to be n bits shorter than $B_1$. In embodiments, n is initialized to 7 and i is initialized to 1, meaning that $B_2$ initially is defined to be 7 bits shorter than $B_1$. In other embodiments in which the average value magnitudes are widely separated (such as in various embodiments of step 625 in method 600), n is initialized to 14 and i is initialized to 2. One skilled in the art will recognize that the choice of initialization values is not critical to the invention.

A subset $S_m$ of S is created 715 that contains m values that are smaller than a value threshold $2^{\hat{}}B_2$. A space-saving measure $M_n$ is calculated 720 as nm−k for the saved space in using the smaller bit length $B_2$ to encode the values in subset $S_m$. In embodiments, the space-saving measure accounts for a one bit label to be added to encode each value. If $M_n > M_{max}$ 725, $S_{max}$ is assigned the current value of $S_m$, $M_{max}$ is assigned the value of $M_n$, and $n_{max}$ is assigned the current value of n 730.

If n>0 735, then the value of n is decremented by i 740, and steps 710 through 735 are repeated to calculate space savings and $M_{max}$ using a larger second bit length $B_2$.

If n<0 735, the value of $M_{max}$ is evaluated 745. If $M_{max}>=0$, then the values in subset $S_{max}$ are encoded 755 using the smaller bit length $B_1-n_{max}$ and the remaining values in set S are encoded using bit length $B_1$ 760. If $M_{max}<=0$, then there is no space savings and the bit length $B_1$ without using any added bit label is used 750 for all values in set S.

4. A Fourth Embodiment of a Method for Compression of Data

Figure 8:
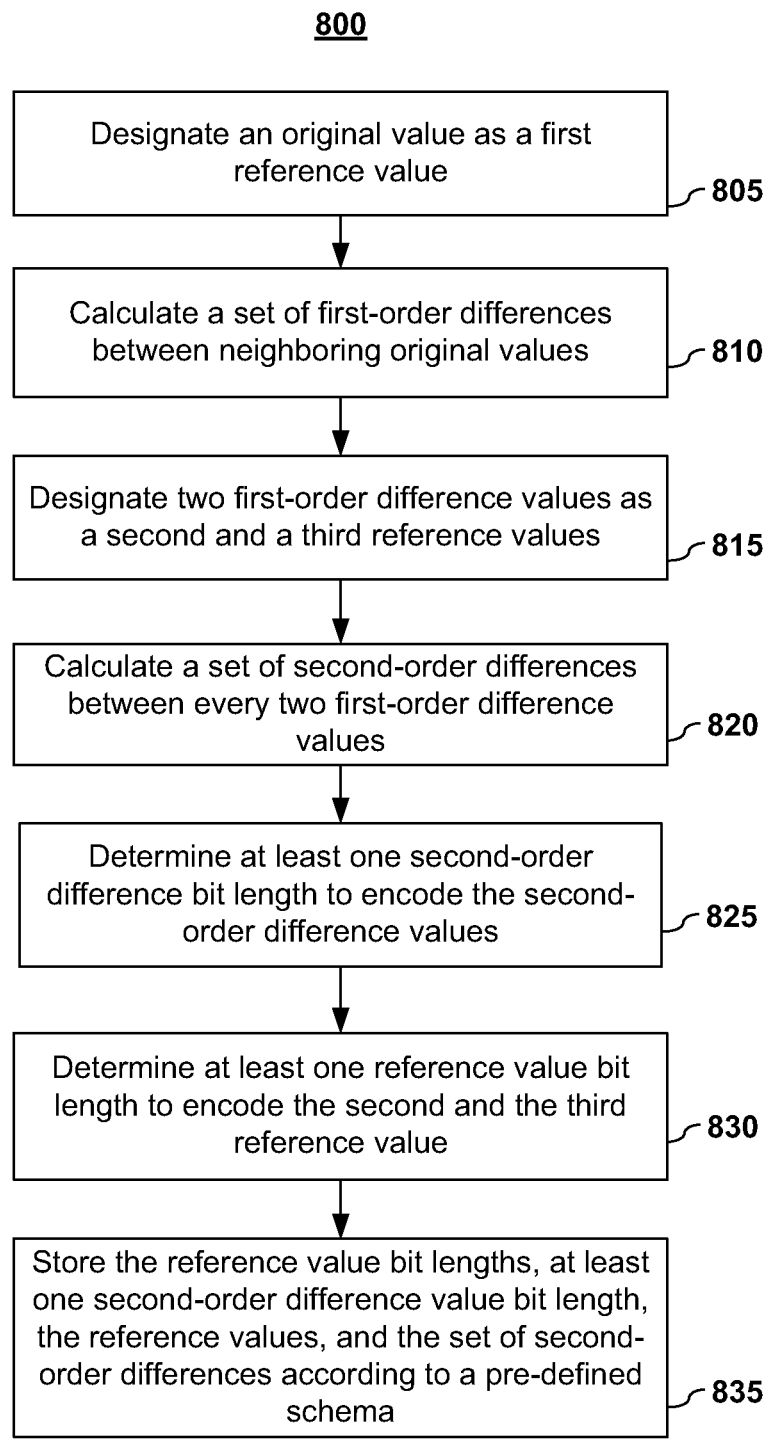
FIG. 8 depicts another embodiment of a method for compressing data according to various embodiments of the invention.

FIG. 8 depicts a method 800 for compressing data 205 according to various embodiments of the invention. The method depicted in FIG. 8 may be used for data in which the values are distributed within two interlaced straight lines having slightly different magnitudes. An exemplary set of 56 data values 205 is associated with each of the GPS parameters "af0," "af1," and "e" (See Table 1).

In embodiments, an original value is designated 805 as a first reference value. A set of first-order difference values is calculated 810 between neighboring original values according to Equation (1) as previously discussed.

Since in this example the data are interlaced, the second-order difference is calculated 820 between every two first-order differences according to the following equation:

$$D_i^2 = D_i^1 - D_{i-2}^1, i=4,\ldots,56 \quad (4)$$

and a second and third reference value, $D_2^1$ and $D_3^1$, are designated 815 from the set of first-order differences.

In embodiments, a second-order value difference bit length is designated 825 based on Equation (2), as previously discussed. In various embodiments, an additional second-order value difference bit length is calculated based on a length optimization method such as method 700.

In embodiments, the first reference value bit length may be designated as the bit length associated with a parameter such as "af0," "af1," and "e" or, alternatively, may be determined according to Equation (2). The bit length for the second and third reference values is determined 830 according to equation (2) where j=1 as previously discussed.

The reference values bit lengths, at least one second-order difference value bit length, the reference values, and the set of second-order difference values are stored 835 in a compressed data set 225 according to a pre-defined schema.

5. A Fifth Embodiment of a Method for Compression of Data

Figure 9:
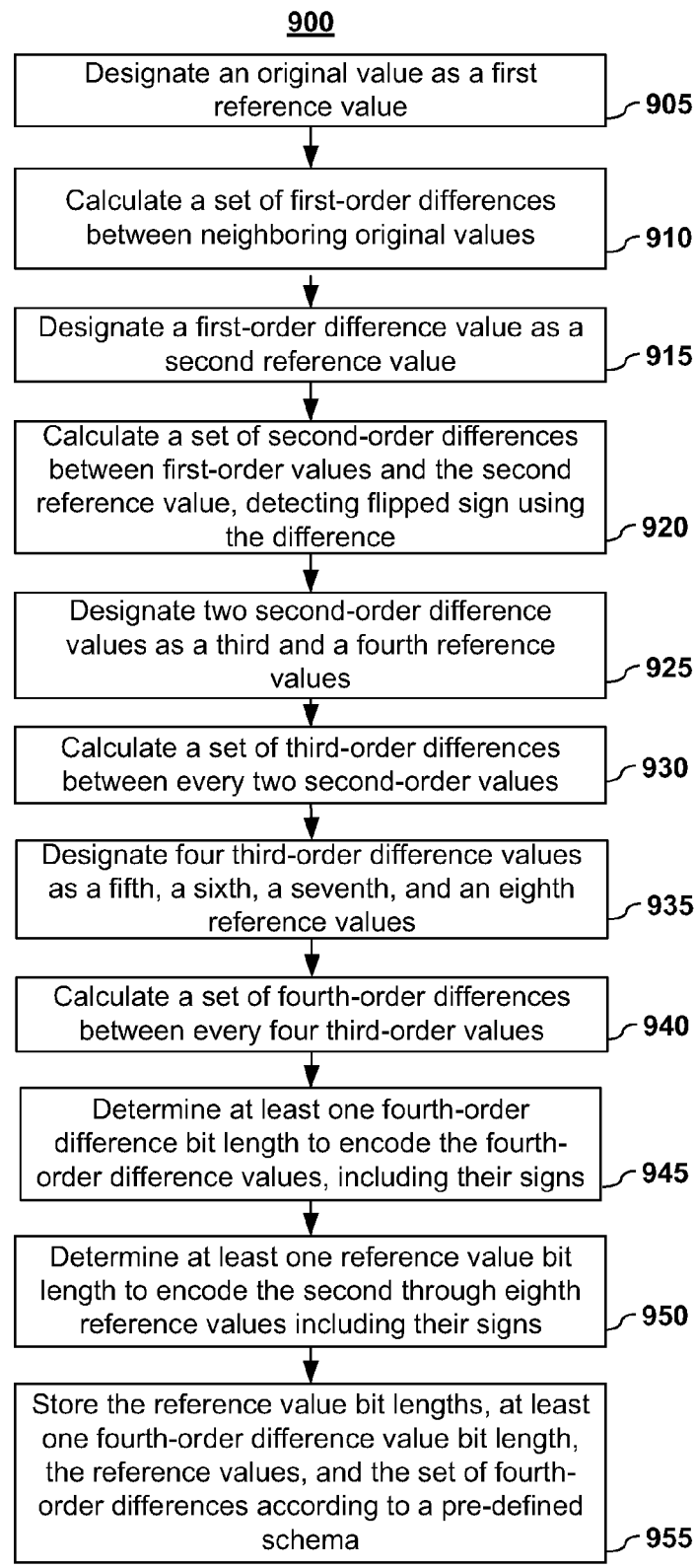
FIG. 9 depicts yet another method for compressing data according to various embodiments of the invention.

FIG. 9 depicts a method 900 for compressing data 205 according to various embodiments of the invention. The method depicted in FIG. 9 may be used for data in which the values are distributed within two interlaced straight lines having very different magnitudes. An exemplary set of 56 data values 205 is associated with the GPS parameter "m0" (See Table 1).

In embodiments, an original value is designated 905 as a first reference value. A set of first-order difference values is calculated 910 between neighboring original values according to Equation (1) as previously discussed.

The type of data distribution in this example may have a characteristic in which the signs of some of the values are flipped to the opposite signs. In embodiments, the flipped sign of an ith first-order difference value may be detected by selecting 915 a first-order difference value as a second reference value $D_2^1$ and then comparing $|D_i^1-D_2^1|$ and $|D_i^1+D_2^1|$. In embodiments, the detection of a flipped sign may be used to insure that magnitude of a second-order difference value is as small as possible for efficient compression. If $|D_i^1-D_2^1|$ is greater than $|D_i^1+D_2^1|$, the sign of the ith first-order value is labeled as negative and its second-order difference is calculated as $(D_i^1+D_2^1)$. Otherwise, the sign of the ith first-order value is labeled as positive and its second-order difference is calculated as $(D_i^1-D_2^1)$ 920.

In embodiments, a set of third-order differences is calculated. Since in this example the data are interlaced, a third-order difference is calculated 930 between every two second-order differences according to Equation (4). A third and a fourth reference value, $D_3^2$ and $D_4^2$, are designated 925 from the set of second-order differences.

In embodiments, a set of fourth-order differences is calculated to further reduce the magnitude of the difference values for compression. A fourth-order difference is calculated 940 between every four third-order values according to the following equation:

$$D_i^4 = D_i^3 - D_{i-4}^3, i=9,\ldots,56 \quad (5)$$

In embodiments, a fifth, sixth, seventh, and eighth reference value $D_5^3 \sim D_8^3$ are designated 935 from the set of third-order differences.

In embodiments, a fourth-order value difference bit length is calculated 945 based on Equation (2), as previously discussed. In various embodiments, an additional fourth-order value difference bit length is determined based on a length optimization method such as method 700.

In embodiments, the first reference value bit length may be designated as the bit length associated with a parameter such as "m0" or, alternatively, may be determined according to Equation (2). The bit lengths for the second reference value, for the third and fourth reference values, and for the fifth, sixth, seventh, and eighth reference values are calculated 950 according to Equation (2) where j=1, 2, 3 as previously discussed. In embodiments, bit lengths except for the first and second reference value bit lengths include an extra bit to label sign-flipping.

The reference values bit lengths, at least one fourth-order difference value bit length, the reference values, and the set of fourth-order difference values are stored 955 in a compressed data set 225 according to a pre-defined schema.

6. A Sixth Embodiment of a Method for Compression of Data

Figure 10:
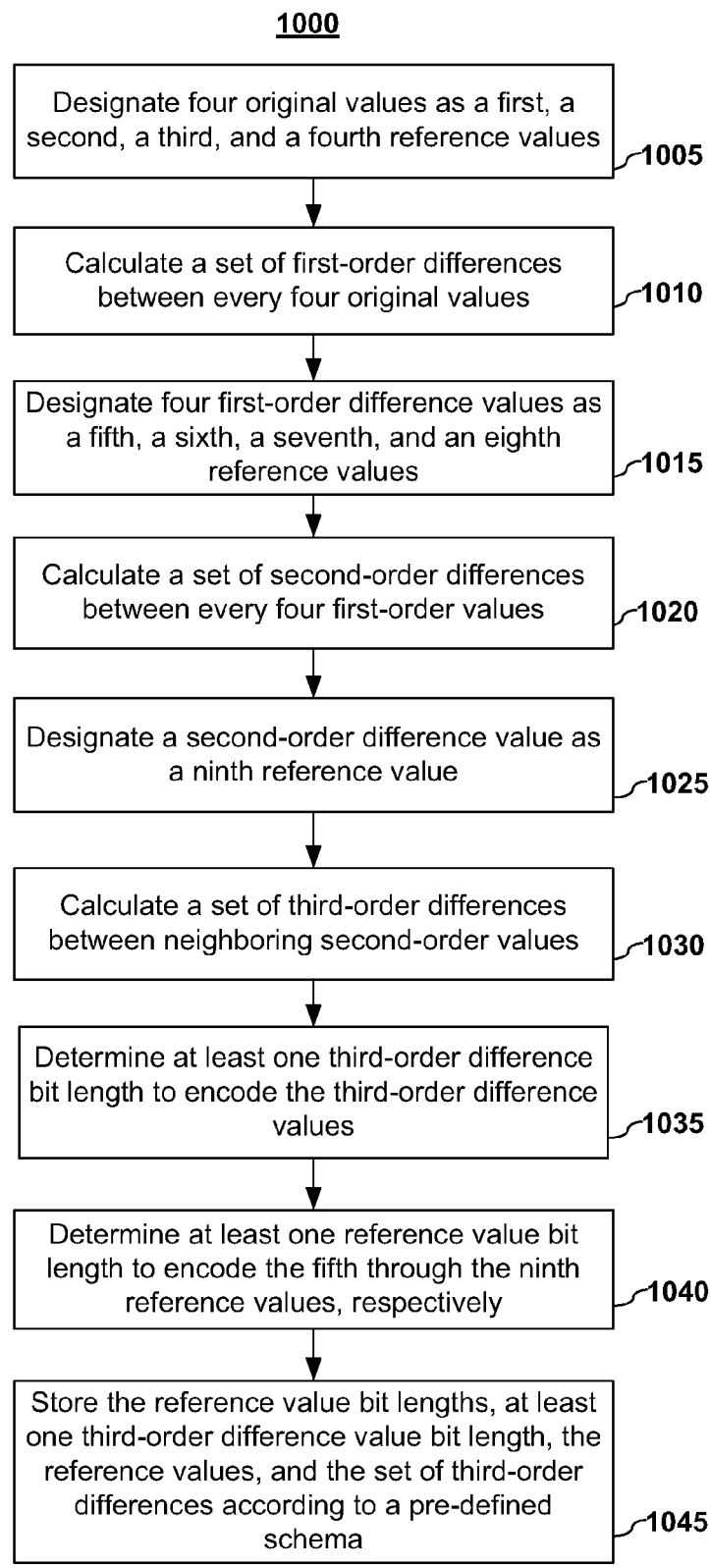
FIG. 10 depicts another method for compressing data according to various embodiments of the invention.

FIG. 10 depicts a method 1000 for compressing data 205 according to various embodiments of the invention. The method depicted in FIG. 10 may be used for data in which the values are distributed within four interlaced sinusoid curves having slightly different magnitudes. An exemplary set of 56 data values 205 is associated with each of the GPS parameters "asqrt," "omega," "crs," "crc," "cus," "cuc," "cis," "cic," "omegadot," "deltan," "idot," and "i0" (See Table 1).

In embodiments, four original values are designated 1005 as a first, second, third, and fourth reference value. A set of first-order difference values is calculated 1010 between every four original values according to the following equation:

$$D_i^1 = D_i^0 - D_{i-4}^0, i=5,\ldots,56 \quad (6)$$

In embodiments, four first-order difference values are designated 1015 as a fifth, sixth, seventh, and eighth reference value. A set of second-order difference values is calculated 1020 between every four first-order difference values according to the following equation:

$$D_i^2 = D_i^1 - D_{i-4}^1, i=9,\ldots,56 \quad (7)$$

In embodiments, a second-order difference value is designated 1025 as the ninth reference value. A set of third-order differences is calculated 1030 between neighboring second-order difference values according to the following equation:

$$D_i^3 = D_i^2 - D_{i-1}^2, i=10,\ldots,56 \quad (8)$$

In embodiments, a third-order value difference bit length is determined 1035 based on Equation (2), as previously discussed. In various embodiments, an additional third-order value difference bit length is calculated based on a length optimization method such as method 700.

In embodiments, the bit length for the first, second, third, and fourth reference values may be designated as the bit length associated with a parameter such as "asqrt" or, alternatively, may be determined according to Equation (2). The bit lengths for the fifth, sixth, seventh, and eighth reference values, and for the ninth reference value are calculated 1040 according to equation (2) where j=1,2 as previously discussed.

The reference values bit lengths, at least one third-order difference value bit length, the reference values, and the set of third-order difference values are stored 1045 in a compressed data set 225 according to a pre-defined schema.

In embodiments, one or more multi-order differencing schemes may be nested within another scheme. For example, by way of explanation and not limitation, a multi-order differencing scheme may be used for the reference original values and/or the first order difference values of method 1000.

D. Methods for Decompressing Data Sets Compressed Using Multi-Order Differencing FIG. 1 illustrates an exemplary GPS data package containing LTE data recorded at 56 timings over a two week period from 31 satellites. The LTE data 120 within the data package are ordered according to a schema based on timing (105, 110), as previously discussed. In embodiments of the present invention, the exemplary LTE data from each satellite may be compressed using a multi-order differencing scheme as implemented in embodiments of method 300 to produce 21 compressed data sets 225. A compressed GPS LTE data package thus would contain 31*21 compressed data sets 225.

Figure 11:
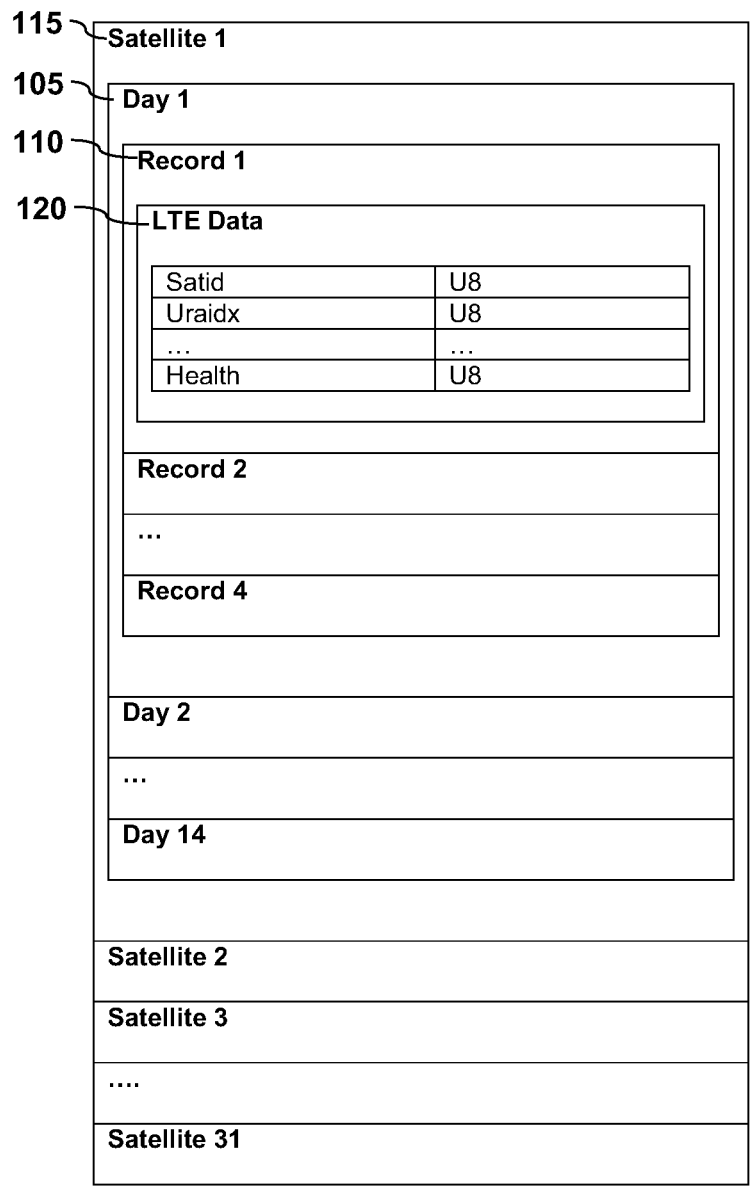
FIG. 11 illustrates ordering of data within a compressed GPS data package according to various embodiments of the invention.

In embodiments, the compressed data within a compressed data package may be ordered according to a schema for maximizing efficient use of resources on a client device during decompression. FIG. 11 illustrates an exemplary data ordering of compressed LTE data 120 within a compressed GPS LTE data package created from the exemplary GPS LTE data package illustrated in FIG. 1. The compressed LTE data 120 are ordered according to a schema based on satellite 115 rather than on timing (105, 110). If the compressed data had been stored according to the original schema, temporary information from earlier timings would have to be stored for use in decompressing data at later timings. By storing the compressed data according to a schema based on satellite, LTE data associated with a timing may be decoded without requiring storage of temporary information. The reduction of storage requirements reduces the memory consumption requirements and computational cost for decompression of data packages.

Figure 12:
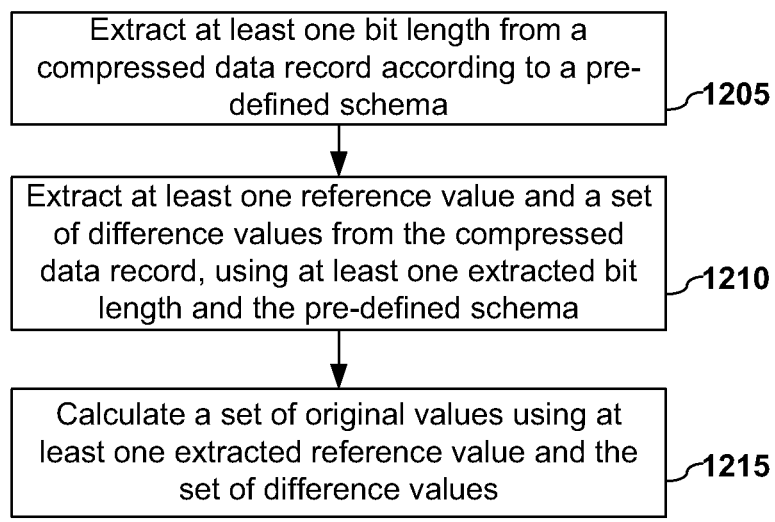
FIG. 12 depicts a method for decompressing a compressed data set according to various embodiments of the invention.

FIG. 12 depicts a method 1200 for generating uncompressed data 205 from compressed data 225 according to various embodiments of the invention. Method 1200 may be implemented in embodiments of system 200B.

In embodiments, the compressed data 225 may have been generated using a multi-order differencing scheme as implemented in embodiments of method 300. An exemplary compressed data set 225 may contain a bit length to encode each of the reference values, at least one bit length to encode a set of difference values, the reference values, and the set of difference values. The compressed data 225 may be ordered according to a pre-defined schema.

In embodiments, at least one bit length is extracted 1205 from the compressed data set 225. The extracted bit lengths may represent reference value bit lengths and difference value bit lengths, ordered as defined in the schema used to generate the compressed data set 225. Each reference value is extracted 1210 based on its corresponding extracted reference value bit length, and a set of difference values is extracted 1210 based on at least one extracted difference value bit length. In embodiments, the uncompressed data values 205 are recovered 1215 by using the extracted reference values and the extracted set of difference values in calculations determined by the type of multi-order differencing scheme used to compress the original values.

The following sections each describe embodiments of steps 1210 and 1215 in method 1200. For purposes of illustration and not limitation, each section is described in terms of the embodiment used to compress the data 205.

1. Decompression of Data Compressed According to Method 400

The data 205 that were compressed using an embodiment of method 400 may be recovered by extracting 1210 the reference value $D_i^0$, and the difference values, $D_i^1$, i=2, ..., 56 from the compressed data set 225.

In embodiments, the 56 values in the original data set may be calculated according to the following equation:

$$D_i^0 = D_i^1 - D_{i-1}^0, i=2, \ldots, 56 \quad (9)$$

2. Decompression of Data Compressed According to Method 500

The data 205 that were compressed using an embodiment of method 500 may be recovered by extracting 1210 the reference values, $D_1^0$ and $D_2^1$, and difference values $D_i^2$, i=3, ..., 56 from the compressed data set 225.

In embodiments, the 56 original data values may be calculated according to the following set of equations:

$$D_i^1 = D_i^2 - D_{i-1}^1, i=3, \ldots, 56$$

$$D_i^0 = D_i^1 - D_{i-1}^0, i=2, \ldots, 56 \quad (10)$$

3. Decompression of Data Compressed According to Method 600

The data 205 that were compressed using an embodiment of method 600 may be recovered by extracting 1210 the reference values, $D_1^0$ and $D_2^1$ and difference values, $D_i^2$, i=3, ..., 56 from the compressed data set 225.

In embodiments, the 56 original data values may be calculated according to the following set of equations:

$$D_i^1 = D_i^2 - D_{i-1}^1, i=3, \ldots, 56$$

$$D_i^0 = D_i^1 - D_{i-1}^0, i=2, \ldots, 56 \quad (11)$$

4. Decompression of Data Compressed According to Method 800

The data 205 that were compressed using an embodiment of method 800 may be recovered by extracting 1210 the reference values, $D_1^0$, $D_2^1$, and $D_3^1$ and the 53 difference values $D_i^2$, i=4, ..., 56 from the compressed data set 225.

In embodiments, the 56 original data values may be calculated according to the following set of equations:

$$D_i^1 = D_i^2 - D_{i-2}^1, i=4, \ldots, 56$$

$$D_i^0 = D_i^1 - D_{i-1}^0, i=2, \ldots, 56 \quad (12)$$

5. Decompression of Data Compressed According to Method 900

The data 205 that were compressed using an embodiment of method 900 may be recovered by extracting 1210 the reference values, the sign flipping labels, and the fourth-order difference values from the compressed data set 225.

In embodiments, the 56 original data values may be calculated according to the following set of equations:

$$D_i^3 = D_i^4 + D_{i-4}^3, i=9, \ldots, 56 \quad (13)$$

$$D_i^2 = D_i^3 + D_{i-2}^2, i=5, \ldots, 56$$

$$D_i^1 = \begin{cases} D_i^2 - D_2^1, \text{ negative label} \\ D_i^2 + D_2^1, \text{ positive label} \end{cases}, i=3, \ldots, 56$$

$$D_i^0 = D_i^1 + D_{i-1}^0, i=2, \ldots, 56$$

6. Decompression of Data Compressed According to Method 1000

The data 205 that were compressed using an embodiment of method 1000 may be recovered by extracting 1210 the reference values, $D_1^0 \sim D_4^0$, $D_5^1 \sim D_8^1$, and $D_9^2$, and the 47 difference values $D_i^3$, i=10, ..., 56 from the compressed data set 225.

In embodiments, the 56 original data values may be calculated according to the following set of equations:

$$D_i^2 = D_i^3 - D_{i-1}^2, i=10, \ldots, 56$$

$$D_i^1 = D_i^2 - D_{i-4}^1, i=9, \ldots, 56$$

$$D_i^0 = D_i^1 - D_{i-4}^0, i=5, \ldots, 56 \quad (14)$$

E. Computing System Implementations

It shall be noted that the present invention may be implemented in any instruction-execution/computing device or system capable of processing data, including without limitation, a general-purpose computer and a specific computer, such as one intended for data processing. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 13:
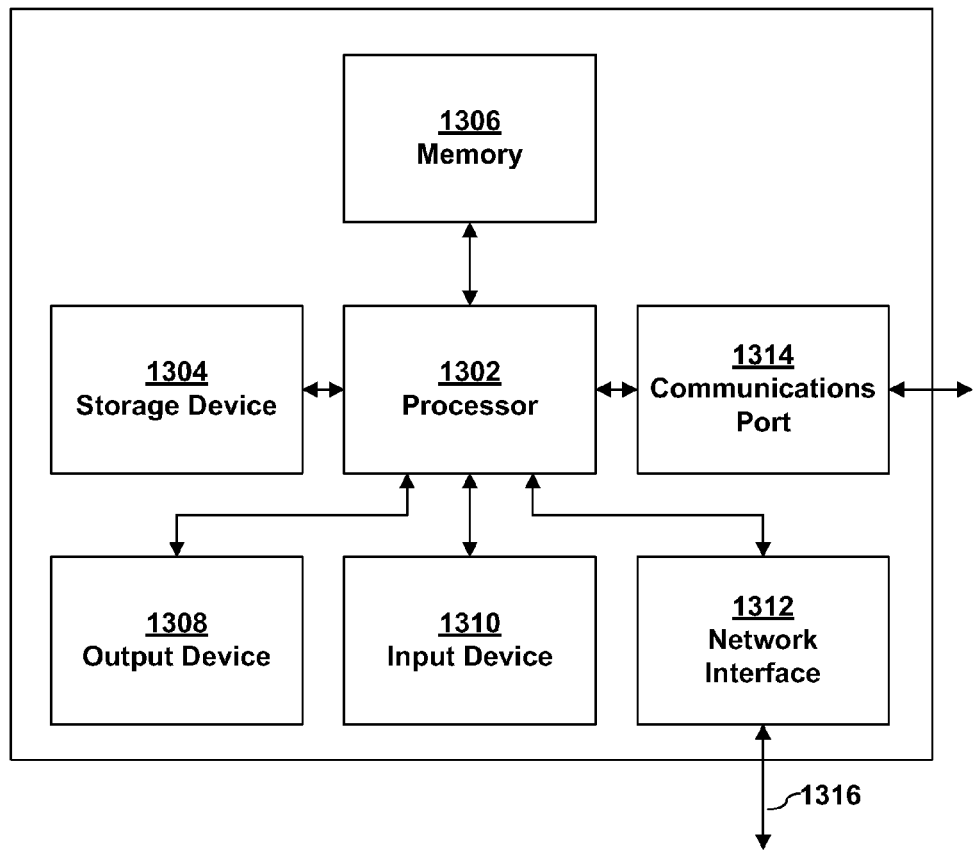
FIG. 13 depicts a block diagram of a computing system, according to various embodiments of the present invention.

FIG. 13 depicts a functional block diagram of an embodiment of an instruction-execution/computing device 1300 that may implement or embody embodiments of the present invention. As illustrated in FIG. 13, a processor 1302 executes software instructions and interacts with other system components. In an embodiment, processor 1302 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1304, coupled to processor 1302, provides long-term storage of data and software programs. Storage device 1304 may be a hard disk drive and/or another device capable of storing data, such as a computer-readable media (e.g., diskettes, tapes, compact disk, DVD, and the like) drive or a solid-state memory device. Storage device 1304 may hold programs, instructions, and/or data for use with processor 1302. In an embodiment, programs or instructions stored on or loaded from storage device 1304 may be loaded into memory 1306 and executed by processor 1302. In an embodiment, storage device 1304 holds programs or instructions for implementing an operating system on processor 1302. In one embodiment, possible operating systems include, but are not limited to, UNIX, AIX, LINUX, Microsoft Windows, and the Apple MAC OS. In embodiments, the operating system executes on, and controls the operation of, the computing system 1300.

An addressable memory 1306, coupled to processor 1302, may be used to store data and software instructions to be executed by processor 1302. Memory 1306 may be, for example, firmware, read only memory (ROM), flash memory, non-volatile random access memory (NVRAM), random access memory (RAM), or any combination thereof. In one embodiment, memory 1306 stores a number of software objects, otherwise known as services, utilities, components, or modules. One skilled in the art will also recognize that storage 1304 and memory 1306 may be the same items and function in both capacities. In an embodiment, one or more of the components of FIGS. 2A and 2B may be modules stored in memory 1304, 1306 and executed by processor 1302.

In an embodiment, computing system 1300 provides the ability to communicate with other devices, other networks, or both. Computing system 1300 may include one or more network interfaces or adapters 1312, 1314 to communicatively couple computing system 1300 to other networks and devices. For example, computing system 1300 may include a network interface 1312, a communications port 1314, or both, each of which are communicatively coupled to processor 1302, and which may be used to couple computing system 1300 to other computer systems, networks, and devices.

In an embodiment, computing system 1300 may include one or more output devices 1308, coupled to processor 1302, to facilitate displaying graphics and text. Output devices 1308 may include, but are not limited to, a display, LCD screen, CRT monitor, printer, touch screen, or other device for displaying information. Computing system 1300 may also include a graphics adapter (not shown) to assist in displaying information or images on output device 1308.

One or more input devices 1310, coupled to processor 1302, may be used to facilitate user input. Input device 1310 may include, but are not limited to, a pointing device, such as a mouse, trackball, or touchpad, and may also include a keyboard or keypad to input data or instructions into computing system 1300.

In an embodiment, computing system 1300 may receive input, whether through communications port 1314, network interface 1312, stored data in memory 1304/1306, or through an input device 1310, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for compressing an Ephemeris data, the method comprising:
    grouping the Ephemeris data parameter with data values of the corresponding parameter taken at different timings;
    designating a set of original data values for a parameter in the Ephemeris data to associate with a multi-order difference scheme; and
    using the multi-order difference scheme associated with the parameter to compress the set of original data values.

2. The method of claim 1, further comprising:
    determining a reference value, the reference value being an original value of the parameter;
    determining a set of first-order difference values, the first-order difference values being difference values between neighboring original values of the parameter;
    determining a reference value bit length to encode the reference values;
    determining a difference value bit length to encode the first-order difference values; and
    storing a compressed data record, the compressed data record including the reference value bit length, the difference value bit length, the reference value, and the set of first-order difference values;
    wherein the parameter associated with the multi-order difference scheme includes a value of either 0 or 1.

3. The method of claim 1, further comprising:
    determining a first reference value, the first reference value being an original value of the parameter;
    determining a set of first-order difference values, the first-order difference values being difference values between neighboring original values of the parameter;
    determining a second reference value, the second reference value being a first-order difference value within the set of first-order difference values;
    determining a set of second-order difference values, the second-order difference values being difference values between neighboring first-order difference values of the parameter;
    determining a first reference value bit length to encode the first reference value;
    determining a second reference value bit length to encode the second reference value;
    determining a second-order difference value bit length to encode the second-order difference values; and
    storing a compressed data record, the compressed data record including the first reference value bit length, the second reference value bit length, the second-order difference value bit length, the first reference value, the second reference value, and the set of first-order difference values;
    wherein the parameter associated with the multi-order difference scheme includes values which are smaller than a prescribed value and distributed within a prescribed range.

4. The method of claim 1, further comprising:
    determining a first reference value, the first reference value being an original value of the parameter;
    determining a set of first-order difference values, the first-order difference values being difference values between neighboring original values of the parameter;
    determining a second reference value, the second reference value being one of the first-order difference values of the parameter;

determining a set of second-order difference values, the
second-order difference values being difference values
between neighboring first-order difference values of the
parameter;
determining a second-order difference value bit length to
encode the second-order difference values;
designating a bit length associated with the parameter as
the bit length for the first reference value and the second
reference value; and
storing a compressed data record, the compressed data
record including the bit length for the first and second
reference values, the second-order difference value bit
length, the first reference value, the second reference
value, and the set of second-order difference values;
wherein the parameter associated with the multi-order difference scheme includes values which are distributed within straight line segment having different magnitudes.

5. The method of claim 1, further comprising:
determining a first reference value, the first reference value being an original value of the parameter;
determining a set of first-order difference values, the first-order difference values being difference values between neighboring original values of the parameter;
determining a set of second-order difference values, the second-order difference values being difference values between every two first-order difference values of the parameter;
determining a second reference value and a third reference value, the second reference value and the third reference value being first-order difference values within the set of first-order difference values;
determining a second-order difference value bit length to encode the second-order difference values;
designating a bit length associated with the parameter as the bit length for the first reference value;
determining a bit length for the second reference value and the third reference value; and
storing a compressed data record, the compressed data record including the bit length for the first reference value, the bit length for the second and third reference values, the second-order difference value bit length, the first reference value, the second reference value, the third reference value, and the set of second-order difference values;
wherein the parameter associated with the multi-order difference scheme includes values which are distributed within two interlaced straight lines having different magnitudes whose difference is smaller than a prescribed value.

6. The method of claim 1, further comprising:
determining a first reference value, the first reference value being an original value of the parameter;
determining a set of first-order difference values, the first-order difference values being difference values between neighboring original values of the parameter;
determining a second reference value, the second reference value being a first-order difference value within the set of first-order difference values;
determining a set of second-order difference values, the second-order difference values being difference values between the second reference value and the first-order difference values of the parameter;
determining a set of third-order difference values, the third-order difference values being difference values between every two second-order difference values;
determining a third reference value and a fourth reference value, the third and fourth reference values being designated from the set of second-order difference values;
determining a set of fourth-order difference values, the fourth-order difference values being difference values between every four third-order difference values;
determining fifth, sixth, seventh, and eighth reference values designated from the set of third-order difference values;
determining a fourth-order difference value bit length to encode the fourth-order difference values;
designating a bit length associated with the parameter as the bit length for the first reference value;
determining a bit length for the second reference value and the third reference value, and determining a bit length for the fifth, sixth, seventh, and eighth reference values; and
storing a compressed data record, the compressed data record including the bit length for the first reference value, the bit length for the second and third reference values, the bit length for the fifth, sixth, seventh, and eighth reference values, the fourth-order difference value bit length, the first through the eighth reference values, and the set of fourth-order difference values;
wherein the parameter associated with the multi-order difference scheme includes values which are distributed within two interlaced straight lines having different magnitudes whose difference is not smaller than the prescribed value.

7. The method of claim 1, further comprising:
designating four original values as first, second, third, and fourth reference values;
determining a set of first-order difference values, the first order difference values being difference values between every four original values of the parameter;
designating four first-order difference values within the set of first-order difference values as fifth, sixth, seventh, and eighth reference values, respectively;
determining a set of second-order difference values, the second-order difference values being difference values between every four first-order difference values within the set of the first-order difference values;
designating a second-order difference value as a ninth reference value;
determining a set of third-order difference values, the third-order difference values being difference values between neighboring second-order difference values;
determining a third-order difference value bit length to encode the third-order difference values;
designating a bit length associated with the parameter as the bit length for the first, second, third, and fourth reference values;
determining a bit length for the fifth, sixth, seventh, and eighth reference values;
determining a bit length for the ninth reference value; and
storing a compressed data record, the compressed data record including the bit length for the first, second, third and fourth reference values, the bit length for the fifth, sixth, seventh and eighth reference values, the bit length for the ninth reference value, the third-order difference value bit length, the first through the ninth reference values, and the set of third-order difference values;
wherein the parameter associated with the multi-order difference scheme includes values which are distributed within four interlaced sine curves.

8. An apparatus for compressing an Ephemeris data, the apparatus comprising:
grouping section that groups the Ephemeris data parameter with data values of the corresponding parameter taken at different timings;
designating section that designates a set of original data values for a parameter in the Ephemeris data to associate with a multi-order difference scheme; and
compressing section that compresses the Ephemeris using the multi-order difference scheme associated with the parameter to compress the set of original data values.

9. An apparatus for decompressing an Ephemeris data, the apparatus comprising:
a value extractor that extracts at least one reference value and a set of difference values from the compressed data record; and
a value calculator that calculates an uncompressed set of data values based on the at least one reference value and the set of difference values.

* * * * *